United States Patent
Siess et al.

(10) Patent No.: US 12,326,362 B2
(45) Date of Patent: Jun. 10, 2025

(54) METHOD AND APPARATUS FOR DETERMINING OR CLASSIFYING THE SURFACE COLOUR OF AT LEAST PARTLY TRANSLUCENT MATERIALS

(71) Applicant: ams Sensors Germany GmbH, Jena (DE)

(72) Inventors: Gunter Siess, Eindhoven (NL); Holger Pless, Eindhoven (NL); Volker Mannheim, Eindhoven (NL)

(73) Assignee: ams Sensors Germany GmbH, Jena (DE)

(*) Notice: Subject to any disclaimer, the term of this patent is extended or adjusted under 35 U.S.C. 154(b) by 212 days.

(21) Appl. No.: 17/593,284

(22) PCT Filed: Mar. 16, 2020

(86) PCT No.: PCT/EP2020/057119
§ 371 (c)(1),
(2) Date: Sep. 14, 2021

(87) PCT Pub. No.: WO2020/187838
PCT Pub. Date: Sep. 24, 2020

(65) Prior Publication Data
US 2022/0196472 A1 Jun. 23, 2022

Related U.S. Application Data

(60) Provisional application No. 62/819,134, filed on Mar. 15, 2019.

(51) Int. Cl.
*G01J 3/02* (2006.01)
*G01J 3/10* (2006.01)
(Continued)

(52) U.S. Cl.
CPC ........... *G01J 3/0224* (2013.01); *G01J 3/0262* (2013.01); *G01J 3/42* (2013.01); *G01J 3/46* (2013.01);
(Continued)

(58) Field of Classification Search
CPC .......... G01J 3/0224; G01J 3/0262; G01J 3/42; G01J 3/46; G01J 3/0229; G01J 3/10; G01J 3/28; G01N 21/255; G01N 21/474
See application file for complete search history.

(56) References Cited

U.S. PATENT DOCUMENTS 11,287,317 B2 * 3/2022 Houck ............... G01J 3/10
2010/0258710 A1 * 10/2010 Wiese ............... H01L 31/173
250/221

(Continued)

FOREIGN PATENT DOCUMENTS

| | | |
|---|---|---|
| CN | 101426419 A | 5/2009 |
| JP | 2018084539 A | 5/2018 |

(Continued)

OTHER PUBLICATIONS

Spooner, D. L., "A New Method for Determining Lateral Diffusion Error in Color Measurements", Proceedings of SPIE/ IS & T, IEEE, US, vol. 2658, Jan. 1, 1996 (Jan. 1, 1996), pp. 151-160. XP000917804, DOI: 10.1117/12.236961, ISBN: 9781628417302.

(Continued)

*Primary Examiner* — Tarifur R Chowdhury
*Assistant Examiner* — Kaitlyn E Kidwell
(74) *Attorney, Agent, or Firm* — VIERING, JENTSCHURA & PARTNER mbB (57) ABSTRACT

An apparatus for determining a colour of a translucent material. The apparatus comprises a first light source configured to illuminate a translucent material at a first surface location, a second light source configured to illuminate the
(Continued)

translucent material at a second surface location spaced apart from said first surface location, and a light spectral sensor configured to detect light at said first surface location. The apparatus is configured to operate the first and second light sources alternately, and such that light detected by the light spectral sensor originating from said first source is principally light diffusely reflected from said first surface location, whilst light detected by the detector originating from said second source is principally light scattered by scattering centres in the interior of the translucent material.

19 Claims, 9 Drawing Sheets

(51) Int. Cl.
*G01J 3/28* (2006.01)
*G01J 3/42* (2006.01)
*G01J 3/46* (2006.01)
*G01N 21/25* (2006.01)
*G01N 21/47* (2006.01)

(52) U.S. Cl.
CPC .............. *G01J 3/0229* (2013.01); *G01J 3/10* (2013.01); *G01J 3/28* (2013.01); *G01N 21/255* (2013.01); *G01N 21/474* (2013.01)

(56) References Cited

U.S. PATENT DOCUMENTS

| | | |
|---|---|---|
| 2011/0221880 A1 | 9/2011 | Liang |
| 2014/0092227 A1 | 4/2014 | Kanamori |
| 2016/0022389 A1* | 1/2016 | Esbech ................. G01J 3/0224 250/208.1 |
| 2017/0126933 A1 | 5/2017 | Kanai |
| 2019/0049304 A1 | 2/2019 | Ehbets et al. |
| 2019/0128734 A1* | 5/2019 | Arbore ................. G01J 3/0216 |
| 2020/0375476 A1* | 12/2020 | Franceschini ........ A61B 5/0261 |
| 2022/0137055 A1 | 5/2022 | Daaboul et al. |

FOREIGN PATENT DOCUMENTS

| | | | |
|---|---|---|---|
| WO | WO-2007119202 A1 * | 10/2007 | ........... A61B 5/0059 |
| WO | 2017184420 A1 | 10/2017 | |
| WO | WO-2018182535 A1 * | 10/2018 | |

OTHER PUBLICATIONS

International Search Report and Written Opinion for PCT/EP2020/057119, mailed Aug. 11, 2020, 14 pages.

"Office Action" from the related CN application No. 202080021535.0, issued Aug. 25, 2023, 19 pages.

Mengmeng Wang et al. "Measuring Human Skin Colour", Society for Imaging Science and Technology, 2015, pp. 230-234.

Chinese office action issued for the corresponding Chinese patent application No. 202080021535.0, dated Aug. 25, 2023, 8 pages (for informational purposes only).

Office Action of corresponding German patent application No. DE 112020001271.9, dated Jun. 12, 2024, 10 pages (for informational purposes only).

* cited by examiner

METHOD AND APPARATUS FOR DETERMINING OR CLASSIFYING THE SURFACE COLOUR OF AT LEAST PARTLY TRANSLUCENT MATERIALS

CROSS-REFERENCE TO RELATED APPLICATIONS

This application is a 371 U.S. National Phase of PCT International Patent Application No. PCT/EP2020/057119, filed on Mar. 16, 2020, which claims the benefit of and priority to U.S. provisional patent application No. 62/819,134, filed on Mar. 15, 2019; the disclosures of which are each incorporated by reference herein in their entirety for all purposes.

TECHNICAL FIELD

The present invention relates to determining or classifying the surface colour of at least partly translucent materials.

BACKGROUND

It is often desirable to be able to determine or otherwise classify the colour of translucent or partly translucent materials. One such material is human skin, where an individual may be interested to determine his or her skin colour for the purpose of selecting and applying an appropriate make-up product such as foundation, eye-shadow, blusher, or highlighter. There are of course many other examples of translucent materials where it might be necessary or helpful to determine or classify colour.

Devices and systems are known for determining skin colour. For example, the publication "Measuring Human Skin Colour", Mengmeng Wang et al, 2015 Society for Imaging Science and Technology, pages 230-234, describes the use of a Konica-Minolta CM700d™ and a Photo Research SpectraScan Colourimeter PR650™ for this purpose.

Known approaches such as those described in Wang typically employ a light source to expose a region of the skin to white light, and an adjacent light detector to detect reflected light. The detector operates as a light spectrometer and provides a spectral power distribution across a wavelength range of interest. The measured spectral power distribution is divided by the spectral power distribution obtained for a reference white tile. The corrected spectral power distribution may then be mapped to a set of colour coordinates, for example the three coordinates of the CIELAB colour space corresponding to lightness, green-to-red and blue-yellow.

To measure the objective colour of a material, it is known to collect all light scattered by the material. That is, both specular and diffusely reflected light is included. These techniques are referred to as Specular Component Included (SCI) techniques. However, the colour that would be perceived by an observer is also affected by properties of the material surface, such as degree of gloss. Specular reflections do not contain information relating to these surface properties. Therefore, to determine the perceived colour of a material, these reflections may be excluded from the spectral power distribution. These techniques are referred to as Specular Component Excluded, or SCE.

Additionally, perceived colour is affected by light scattered back from the interior of a translucent material. This should be taken into account when detecting the colour of such a material.

SUMMARY

According to a first aspect of the present invention there is provided an apparatus for determining a colour of a translucent material. The apparatus comprises a first light source configured to illuminate a translucent material at a first surface location, a second light source configured to illuminate the translucent material at a second surface location spaced apart from said first surface location, and a light spectral sensor configured to detect light at said first surface location. The apparatus is configured to operate the first and second light sources alternately, and such that light detected by the light spectral sensor originating from said first source is principally light diffusely reflected from said first surface location, whilst light detected by the detector originating from said second source is principally light scattered by scattering centres in the interior of the translucent material. The apparatus further comprises a processor for combining light spectra detected by the light spectral sensor at said first surface location whilst operating each of the first and second light sources, to provide a combined light spectrum indicative of the colour of the translucent material. The spectra or readings can alternatively be used to reconstruct a spectrum or the data used in other ways.

In an embodiment, the first and second light sources may be broadband/white light sources.

In an embodiment, the first and second light sources may be respective first and second spaced apart light emitting diodes.

In an embodiment, the apparatus may further comprise a light blocking barrier located between, on the one side, said first light source and said light spectral sensor, and on the other side, the second light source, the light blocking barrier substantially preventing light from the second sensor reaching the light spectral sensor other than by transmission through the translucent material.

In an embodiment, the apparatus may further comprise a light blocking barrier located between, on the one side, at least said first light source and said light spectral sensor, and on the other the translucent material, the light blocking barrier having an aperture provided therein to transmit light through the barrier. Said aperture may be located substantially above one of the first light source and the light spectral sensor.

In an embodiment, the apparatus may further comprise a housing within which the light spectral sensor is located, the housing having an aperture such that light from said first location is able to enter the housing whilst light transmitted directly from the first/or second light source is substantially blocked.

In an embodiment, the apparatus may further comprise beam directing optics for directing light between, on the one side, the first light source and the light spectral sensor, and on the other, the translucent material.

In an embodiment, the apparatus may further comprise polarizers adjacent to the first light source and the light spectral detector for polarizing light transmitted between, on the one side, the first light source and the light spectral sensor, and on the other, the translucent material.

In an embodiment, the processor may be further configured to map the combined light spectrum to an opaque colour reference.

In an embodiment, the first and second light sources and said light spectral sensor may be located substantially in a common plane.

In an embodiment, the apparatus may further comprise a layer of transparent material substantially coplanar with said common plane wherein, in use, said translucent material is held against said layer.

It is noted that light detected by the light spectral sensor originating from said first source might additionally comprise light reflected at the boundaries between skin layers.

According to a still further aspect of the present invention there is provided a method of determining a colour of a translucent material. The method comprises operating a first light source to illuminate the translucent material at a first surface location, and operating a second light source to illuminate the translucent material at a second surface location spaced apart from said first surface location. The first and second light sources are operated alternately whilst detecting light at said first surface location such that light detected is principally a combination of (a) light from said first light source diffusely reflected from said first surface location and (b) light from said second source scattered by scattering centres in the interior of the translucent material. The method further comprises combining light spectra detected by the light spectral sensor at said first surface location whilst operating each of the first and second light sources, to provide a combined light spectrum indicative of the colour of the translucent material.

In an embodiment, said first and second light sources may be white light sources.

In an embodiment, said first and second light sources may be respective first and second spaced apart light emitting diodes.

In an embodiment, the method further comprises: substantially preventing light from the second sensor reaching the light spectral sensor other than by transmission through the translucent material.

In an embodiment, the method further comprises: directing light between, on the one side, the first light source and the light spectral sensor, and on the other, the translucent material, by beam directing optics.

In an embodiment, the method further comprises: polarizing light transmitted between, on the one side, the first light source and the light spectral sensor, and on the other, the translucent material.

In an embodiment, the method further comprises: mapping the combined light spectrum to an opaque colour reference.

DETAILED DESCRIPTION

The embodiments described below are concerned with providing a means for determining or classifying the colour of at least partly translucent materials such as skin. As with known techniques, a material is illuminated and reflected light is collected at a detector to obtain a spectral power distribution ("reflectance spectrum") from the material. However, a portion of the incident light which passes through the material surface due to translucency of the material is not reflected back to the detector. For previous techniques, this would result in reduced intensities at given wavelengths on the reflectance spectrum, and possible inaccuracies in colour determination. Therefore, a means is proposed here to compensate for the effect of the translucency of the material.

This is achieved by separately measuring the optical properties of the material surface and the optical properties of the material below the surface. The optical properties of the surface may be measured by obtaining a first reflectance spectrum in which the contribution of specular reflected light is minimised. The principle component of this spectrum is therefore light diffusely reflected from the surface. The optical properties of the material below the surface are measured by obtaining a second reflectance spectrum, or 'translucence' spectrum, principally including only light reflected by interior scattering centres. That is, only light that has penetrated the surface of the material due to the translucency of the material, and subsequently been scattered back to the detector. The two spectra are obtained using different illumination sources.

Algorithms may then be used to scale the information from the surface and from the interior, and these are combined to obtain a measurement of the optical properties of the material which has been compensated for the material translucency. The compensated spectrum may then be used to map the colour of the translucent material to a reference system such as a colour space, or to an opaque reference material.

The proposed solution has improved performance when obtaining colour measurements of the surface and interior of at least partly translucent materials. This may include equivalent measurements in other regions of the electromagnetic spectrum, such as UV or IR, either in addition or separately to optical measurements. Furthermore, other properties of the interior of the material may be determined by taking into account surface properties like colour or skin tone, or other spectral (reflection or absorption) properties.

Once the surface colour has been determined and classified, a system may be used to suggest further actions, based upon the determined surface colour classification. A similar approach also has potential for spectral ambient light sensing.

Figure 1:
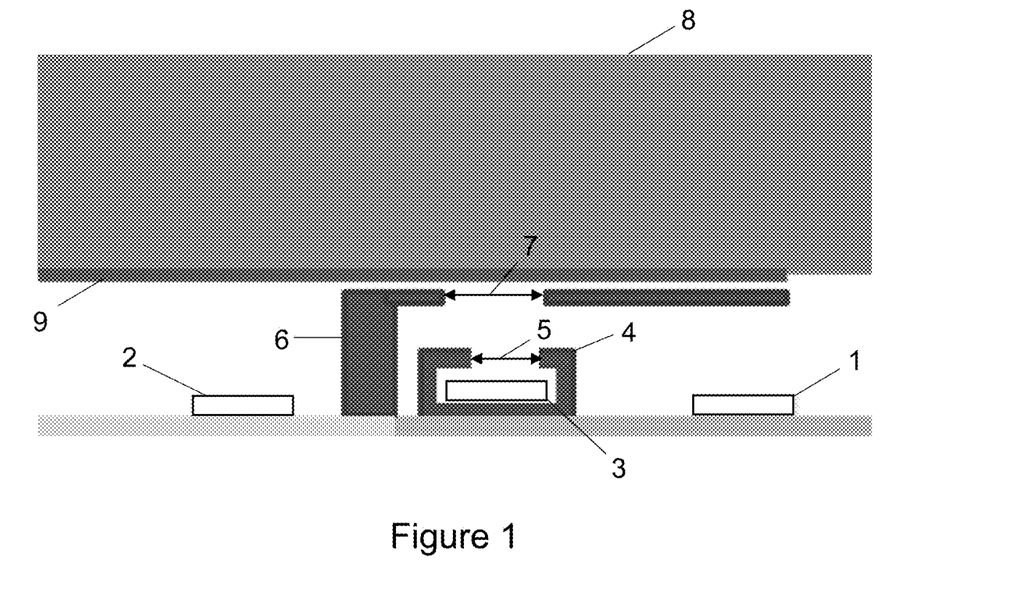
FIG. 1 illustrates schematically a side view of an exemplary apparatus for determining or classifying the colour of an at least partly translucent material.

The exemplary colour measurement apparatus of FIG. 1 comprises a first light source 1 (first LED), a second light source 2 (second LED), and a light detector 3. The light detector 3 is provided within a housing 4, which defines an aperture 5. Also provided are means for "selecting" the reflected light which is received by the detector, according to various parameters. In this exemplary apparatus, this is achieved by an opaque barrier 6, provided with an aperture 7. An at least partly translucent material 8 is also shown, adjacent to a cover glass 9 of the apparatus. The barrier 6 prevents light passing from the second light source to the space above the detector 3 other than through the translucent material 8.

It will be appreciated that the apparatus will include further components including a processor for controlling the LEDs and for receiving measurement data from the detector. It may also include a display for displaying a measurement result.

Figure 2:
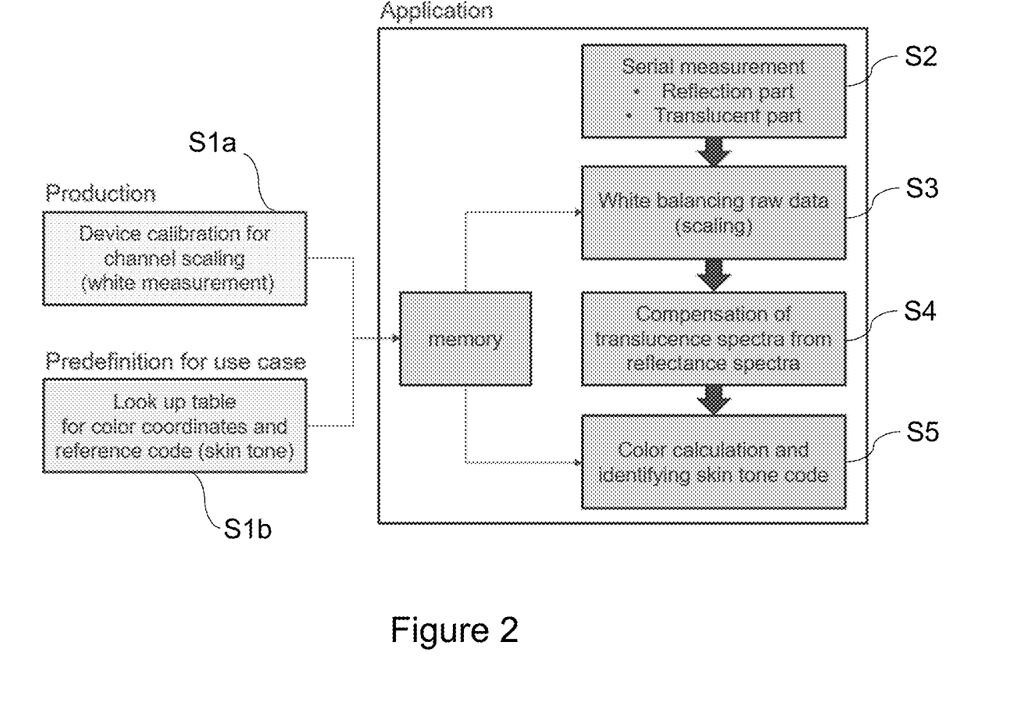
FIG. 2 is a flow chart illustrating general steps in a method for determining or classifying the colour of an at least partly translucent material.

General steps for a determining the colour of an at least partly translucent material are shown in FIG. 2.

Before use, the apparatus is first calibrated for channel scaling (S1a). This may be achieved by using the apparatus to measure a reflectance spectrum of a standard target, for example a white panel of a ColourChecker colour calibration target or other white reflective card. The white measurement is used to represent 100% reflection for all channels (i.e. frequency bands of the measurement range). The resulting calibration spectrum may then be stored in memory. This step may be carried out as part of device testing during production.

Also prior to use, a table is obtained which maps colour coordinates to given reference codes for discrete colours, for example skin tones (S1b). This may be achieved by using the apparatus to make measurements of skin tone cards to obtain a reflectance spectrum and colour coordinates for each. The colour coordinates may be, for example, the three coordinates of the CIELAB colour space, corresponding to lightness, green-to-red and blue-yellow. The measurements may be collected by a single device, and the resulting table may be distributed to other devices for storage in memory before use by the end user. Alternatively, the data may be theoretical data, or generated by simulation.

During normal use, the surface of a material is presented to the apparatus. A measurement is made on the material (S2), for example using the apparatus shown in FIG. 1, to obtain a first reflectance spectrum from light diffusely reflected by the material surface, and a second 'translucence' spectrum including only light reflected by interior scattering centres. Placing the surface of the material in direct contact with the cover glass will tend to exclude external stray light. However, the material may be also be placed at a fixed distance from the cover glass. Algorithms may use the distance between the components of the apparatus and the material for data processing. The thickness of the cover glass may be, for example between 0.3 and 3 mm. The distance from the printed circuit board (PCB), on which all the components may be mounted, to the cover glass, may be for example 1 to 15 mm, for example 1.9 mm. Therefore, distances such as these may be input to the apparatus, for example during the predefinition for use stage of FIG. 2. The thickness of any additional spacers between the cover glass and the material, such as mobile phone covers, may also be input to the apparatus, for example by the user prior to use. It is advantageous for any such additional spacers to be thin, for example with a thickness of 2 mm or less. The material may be opaque or partly translucent, and the shape of the material is not limited, although optimum results may be achieved with a flat material.

Once the material is in place, it is illuminated alternately by the first and second LEDs 1, 2, and the detector 3 receives a portion of the light reflected by the material. The detector housing 4 prevents direct illumination light from reaching the detector 3 without first being reflected by the material. The LEDs illumination cycles may be repeated multiple times, e.g. to allow averaging of results.

When the material is illuminated by the first LED 1, specular reflections (i.e. reflections with an angle of reflection equal to the angle of incidence) of the illumination light are not collected by the detector. In the exemplary apparatus of FIG. 1, the illumination light passes from the first LED 1, through the aperture 7 in the opaque barrier 6, to the material. Light reflected by the material must also pass through the aperture 7 in order to reach the detector. The detector is aligned with the aperture 7 approximately along the normal to the material surface, and the first LED 1 is displaced from the detector so as to illuminate the material through the aperture at an angle with respect to the normal to the material surface, for example at an angle between 30° and 80°, such as 60°. Therefore, the aperture 7 is aligned with the detector away from the path which would be taken by light from the first LED 1 after reflecting in a specular manner from the material surface. Reflections of light from the first LED 1, from the interior of the material, received by the detector 3 are also minimised by virtue of the angle of illumination and the aperture 7.

During illumination by the second LED 2, light leakage (cross-talk) directly from the second LED 2 and from surface reflections of the second LED 2 light to the detector 3 is minimised by the barrier 6. The apparatus is therefore configured such that only light which has been back-scattered from below the surface of the skin, i.e. due to the translucency of the material, can reach the detector from the second LED 2. It is advantageous for the barrier 6 to extend as close as possible to the surface of the material. To reach the detector, illumination light must pass through the surface of the material due to the translucency of the material, and be scattered around the barrier to the detector by internal scattering centres.

Where there is more than one first LED 1, these LEDs may be switched on and the resulting reflections received in sequence (although parallel operation is also possible, e.g. where the material is inhomogeneous and/or the sensor is not in direct contact with the sample, e.g. if there is a phone cover that leaves an air gap of, for example, 2 mm from the cover glass to the target). After readings are recorded, the integration time, gain and other settings may be adjusted as appropriate, and the measurement repeated. Several measurements in the same spot can be used for averaging and/or excluding the influence of time-varying signals. Alternatively, any such time-varying signals may be actively used for data processing. The surface colour of inhomogeneous targets such as skin may be better estimated if several measurements are taken in close proximity.

Figure 3:
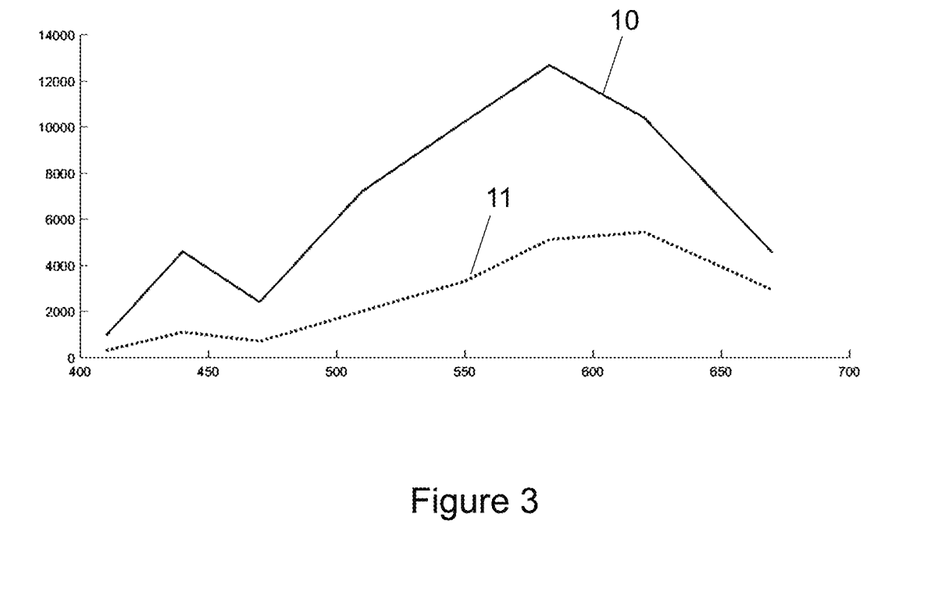
FIG. 3 illustrates exemplary reflectance spectra obtained by step S2 of FIG. 2.

Examples of the resulting spectra are shown in FIG. 3, where the upper trace 10 is the reflectance spectrum obtained from light diffusely reflected by the material surface from the first LED 1, and the lower trace 11 is the translucence spectrum including only light reflected by interior scattering centres from the second LED 2.

Using the data obtained during the device calibration step (S1a), the reflectance spectrum from the first LED 1 is then scaled in step S3 to the white measurement which represents 100% reflectance over the full range of wavelengths. The results are shown in FIG. 4 (trace 12).

Figure 4:
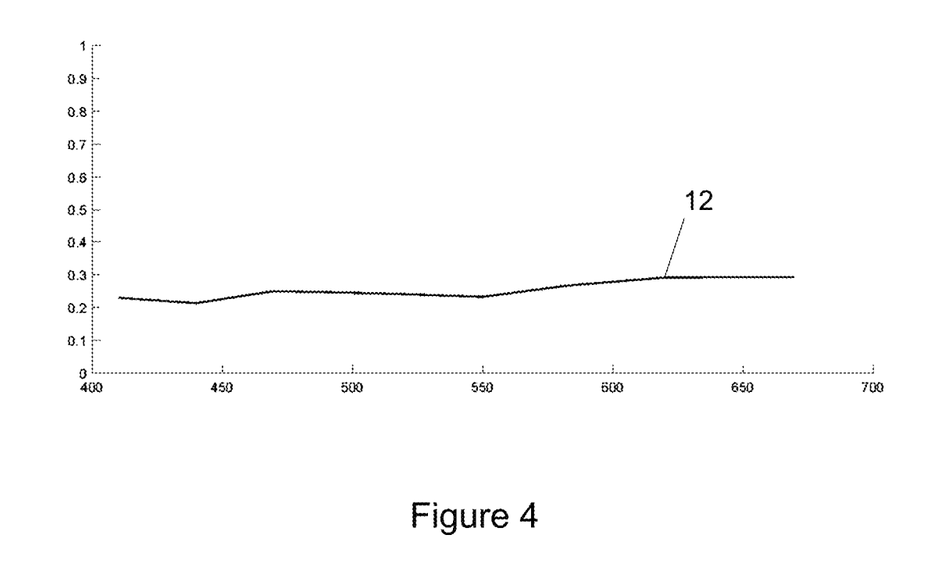
FIG. 4 illustrates a reflectance spectrum of FIG. 3 after scaling to a white reference.
Figure 5:
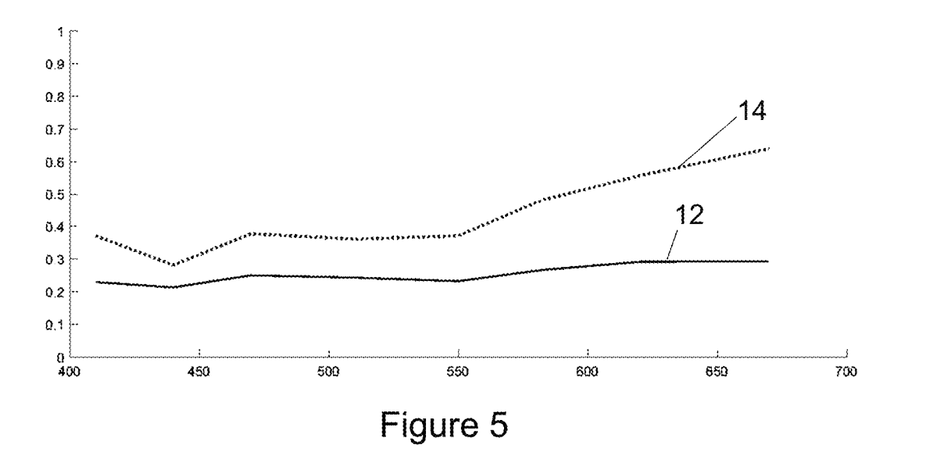
FIG. 5 illustrates an uncompensated reflectance spectrum from FIG. 4 and a reflectance spectrum obtained from a colour-matched opaque reference.

The graph of FIG. 5 illustrates the uncompensated reflectance spectrum 12 from FIG. 4 in comparison with a reflectance spectrum 14 obtained from a colour-matched reference. Clearly, the skin measurement has lower spectral intensities, because a portion of the incident light is scattered away from the detector from deep within the material. The translucence spectrum is therefore used to compensate for the effect of material translucence on the surface reflectance spectrum (S4), for example by weighting and combining the two spectra. For example, the following formula may be applied: signal_comp(channel)=signal_WB(channel)*(1+X*ratio(channel)), where signal_comp(channel) is the compensated signal, signal_WB(channel) is the white-scaled reflectance spectrum from LED 1, X is a given value, and ratio(channel) is the ratio of the raw signal of the reflectance and translucence spectra for a given wavelength.

Figure 6:
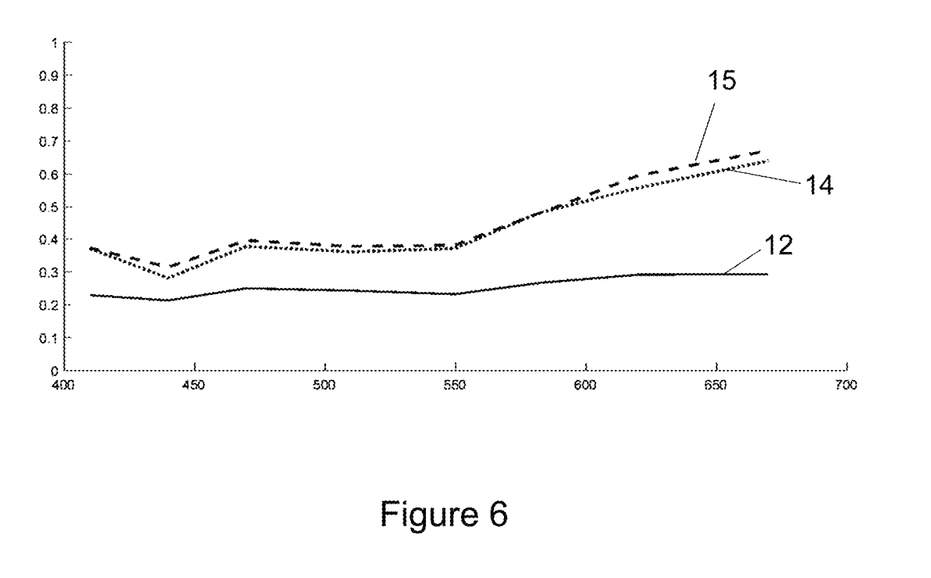
FIG. 6 illustrates a compensated reflectance spectrum obtained from the spectra of FIG. 5, and a reflectance spectrum obtained from the colour-matched opaque reference.

FIG. 6 shows the effect of applying the formula to the material spectra shown in FIGS. 3 and 4. A compensated spectrum 15 is produced, which more closely matches the spectrum of the corresponding opaque material 14 than the uncorrected spectrum 12. Alternative compensation algorithms may be determined by conducting empirical analyses. For example, spectra obtained from an at least partly translucent material may be compared to spectra obtained from an opaque reference material colour-matched by eye. Algorithms may then be derived which, when applied to the material data, produce a compensated spectrum with the greatest agreement to the reference spectrum. This may be performed in the production, or pre-definition for use stages of FIG. 2.

After compensation, a colour calculation may be performed on the compensated spectrum to obtain corresponding colour coordinates (S5). If the desired colour coordinates are CIElab coordinates, CIE XYZ tristimulus coordinate values may first be obtained from the compensated spectrum. This may be performed by a calibration matrix operation, for example using a 3×8 calibration matrix calculated by a target calibration with a set of colour cards (e.g. ColourChecker), to convert a 1×8 signal vector into the colour coordinates. The XYZ coordinates may then be converted to CIElab coordinates by standard methods.

Once colour coordinates have been obtained, the calculated colour coordinates are compared to the color coordinates of the reference set within the predetermined look-up table, and the closest match is selected (S5). The closest match may be considered to be the colour code with corresponding colour coordinates the shortest distance away from the compensated colour coordinates in a colour space, such as the CIELAB colour space (i.e. with the smallest delta E value).

As well as the colour of the material surface, the data may also be used to determine the degree of translucency of the material or the presence of opaque substances on the material surface. These properties may be determined from the ratio between the spectra obtained from the first and second LEDs.

The method described may be used to perform a colour measurement of skin, and to determine and classify the skin tone. This could be of particular use in the field of cosmetics. In this case, additional steps may be carried out. For example, a person's make-up may be removed, and the signal from the second LED 2 may be compared to the signal from the first LED 1, to check for residual, opaque substances on skin. If opaque substances are detected, an instruction may be given to the user to repeat make-up removal. Further parameters may also be measured, such as agitation of the subject, by measuring pulse rate or breathing rate. These parameters may be obtained by frequent measurement and monitoring of the spectral properties of the skin as a function of time and can be determined or used to further improve the classification result when determining skin tone. Still further parameters may be input directly by the user, for example, time of day or fatigue. Algorithms are then used to determine the skin colour or classify the skin type, at which point an expert database may be used to suggest further actions such as application of cosmetics or other treatment. In addition, the method may be used to determine skin colour and to classify skin tone after the application of cosmetics or other treatment, again by comparing the signal from the second LED 2 to the signal from the first LED 1.

The surface colour of other translucent materials may also be determined, for example other biological materials such as leaves and crops.

Furthermore, the additional signal from the second LED 2 allows for improved surface colour determination for opaque surfaces, and for translucent surfaces partly covered by an opaque substance, for example, human skin covered by cosmetics that do not totally obscure the natural skin tone.

Figure 7:
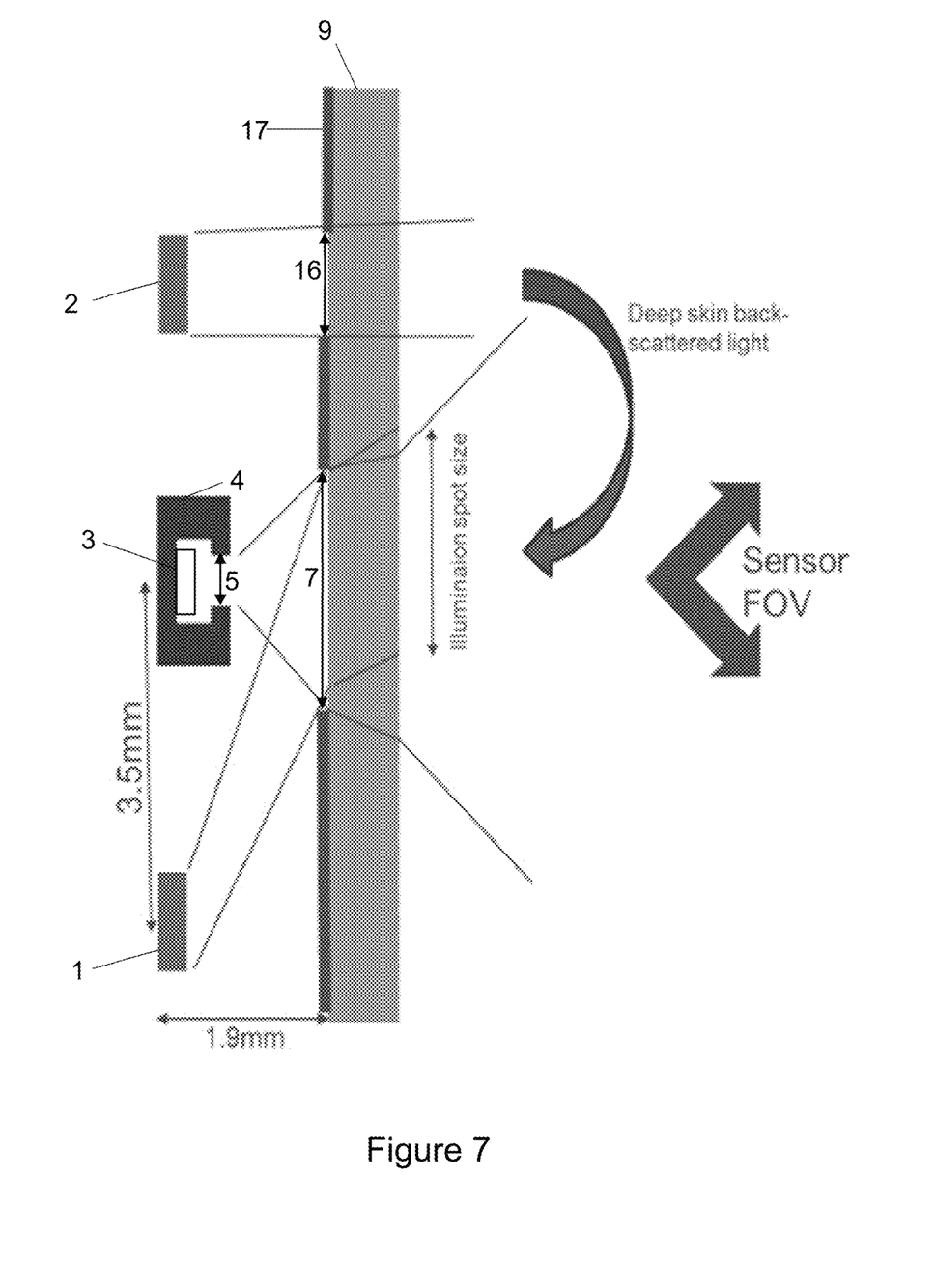
FIG. 7 shows schematically a side view of an exemplary apparatus utilising first and second apertures.

It will be appreciated that modifications may be made to the apparatus of FIG. 1. For example, FIG. 7 shows an alternative apparatus where a second aperture 16 is provided through which the illumination light from the second LED 2 passes. The second LED 2 and the aperture 16 are aligned substantially along the normal to the material surface, therefore the second LED 2 illuminates the material with light which is approximately parallel to the normal of the material surface, for example at a 0° angle. Light from LED 2 must, therefore, be scattered by interior scattering centres to reach the detector through the first aperture 7. In the case of FIG. 7, the optical barrier 6 may be considered to be the solid portion between the first and second apertures 7, 16. Here, the barrier does not extend in the direction away from the material to the level of the detector or second LED 2. Therefore, to reduce cross-talk from the second LED 2 to the detector in this case, it may be advantageous to provide a gap of at least 2 mm, for example 4 mm or more, between the nearest edges of the first and second apertures. The first and second apertures may be formed from cut-out portions in a thin, optically opaque, absorbing film 17, provided adjacent to the cover glass 9. The first aperture may have a diameter of 2.8 mm, and the second aperture may have a diameter of 1.8 mm, which may result in a larger illumination spot for the first LED 1 than for the second LED 2. The optically opaque components may be black, 3D printed components.

Figure 8:
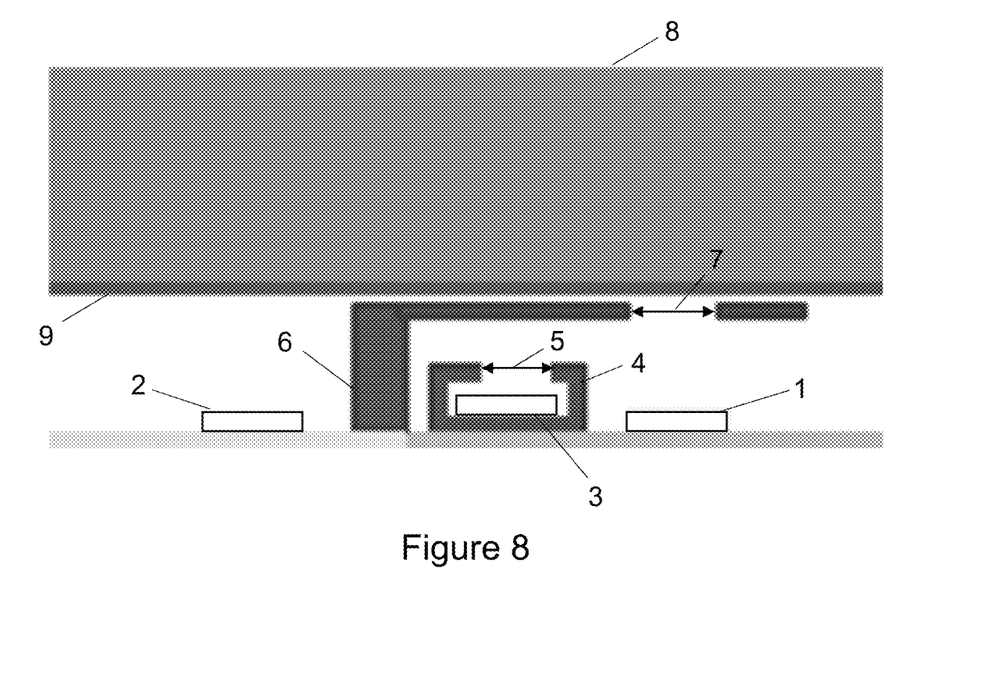
FIG. 8 shows schematically a side view of an exemplary apparatus, in which the detector and aperture are aligned substantially along the normal to the material surface.

FIG. 8 shows an alternative possible arrangement, in which the first LED 1 may be aligned with the aperture approximately along the normal to the material surface, and the detector may be displaced from the first LED 1 such that only light reflected from the material surface at an angle with respect to the normal of the material surface is collected by the detector. In this configuration, it is the high angle of reflection between the illumination spot and the detector with respect to the material surface normal that minimises reflections from the interior of the material of light reaching the detector from the first LED 1.

Figure 9:
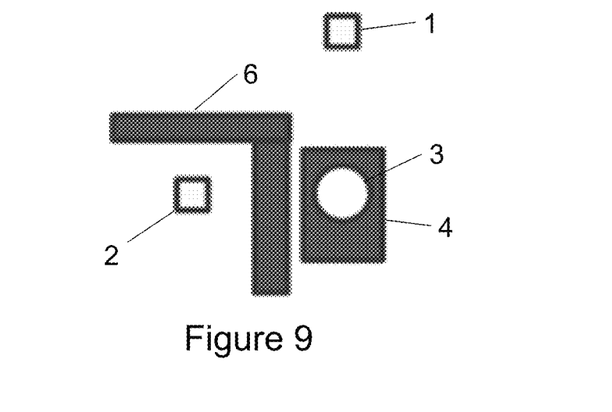
FIG. 9 shows schematically a plan view of an exemplary apparatus, in which a first light source is arranged out of line with a second light source and the detector.

FIG. 9 shows a plan view of an exemplary arrangement in which the first light source is arranged out of line with the second light source and the detector.

Figure 10:
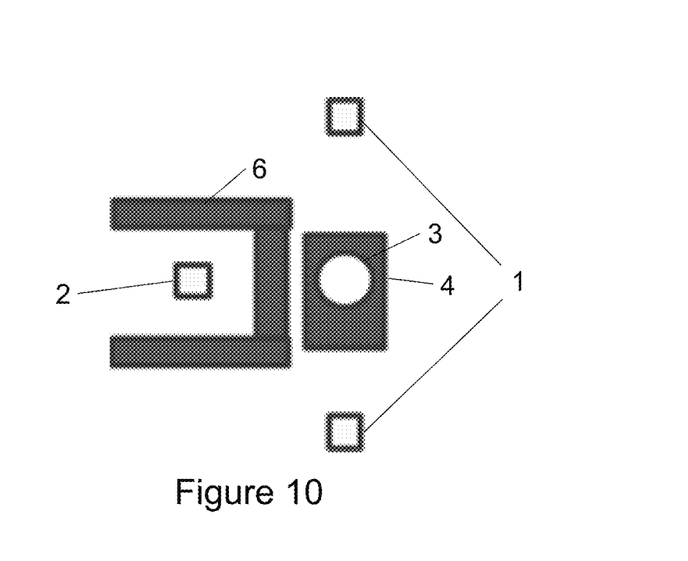
FIG. 10 shows schematically a plan view of an exemplary apparatus with two first light sources.

FIG. 10 shows an apparatus comprising more than one first LED 1 configured to illuminate the material at the same illumination spot. If more than one illumination beam is used, all beams should have the same beam angle with respect to the normal of the illuminated material surface. The use of more than one first LED 1 is particularly advantageous for the analysis of non-homogenous materials, although the use of a single first LED 1 may, in some cases, produce a compensated spectrum which more closely resembles the reflectance spectrum that would be obtained from a colour-matched opaque reference. Instead of providing a second light source, additional optics may instead be used to generate multiple illumination beams from a single first LED 1.

Also shown in FIGS. 9 and 10, the arrangement of the opaque barrier 6 is adapted for the specific arrangements of the other components. Other barrier configurations are possible.

Figure 11:
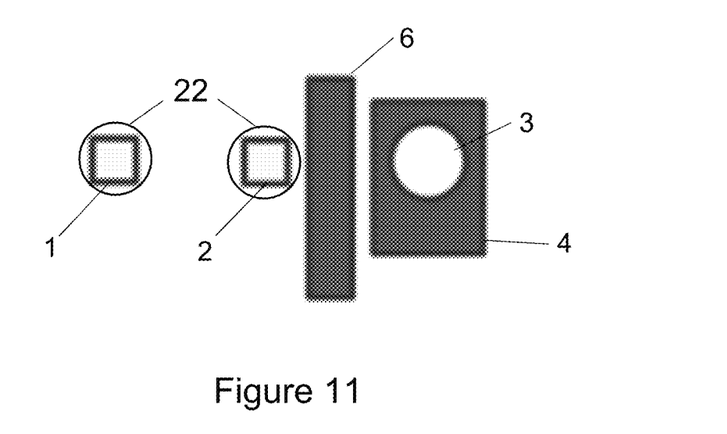
FIG. 11 shows schematically a plan view of an exemplary apparatus in which first and second light sources are located on the same side of light barrier with a detector on an opposite side.

FIG. 11 shows an alternative apparatus in which the first LED 1 is located on the same side of the optical barrier and detector as the second LED 2. This arrangement requires collimating optical components 22.

Figure 12:
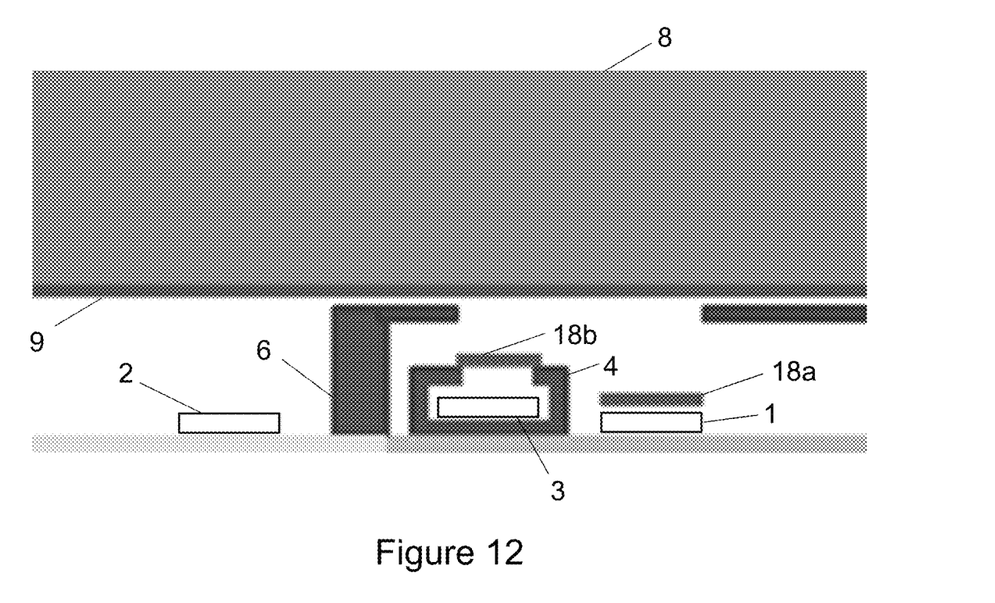
FIG. 12 shows schematically a side view of an exemplary apparatus provided with light polarisers.
Figure 13:
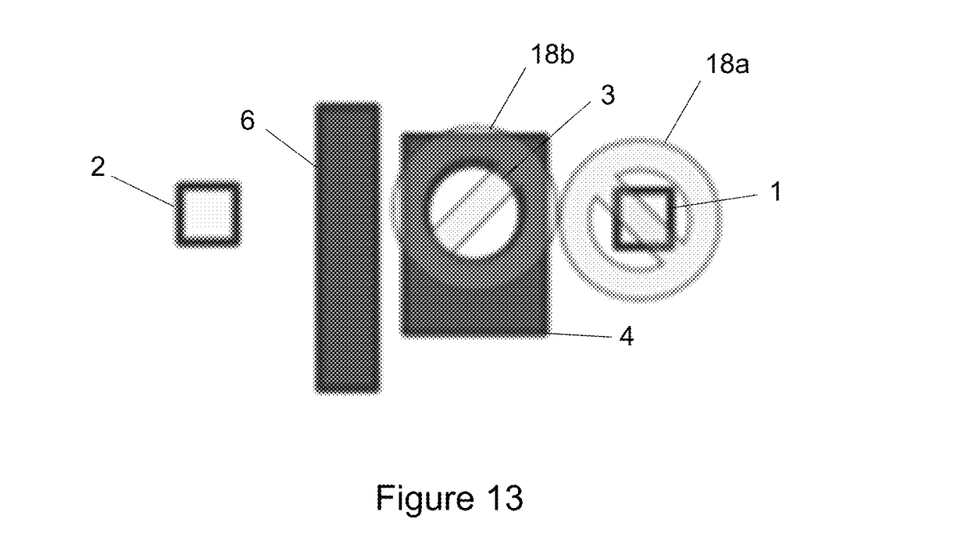
FIG. 13 shows schematically a plan view of the apparatus of FIG. 12.

FIG. 12 shows a side view of an alternative apparatus, in which crossed or circular polarisers 18 are provided adjacent to the first LED 1 and the detector. FIG. 13 illustrates a plan view of the same apparatus.

Unpolarised light reflected in a specular manner from a surface may become partly linearly polarised. Therefore, a polariser 18b provided adjacent to the detector may be configured to block a portion of the light which has been reflected in a specular manner by the material. The degree of polarisation is dependent upon the angle of incidence and the properties of the material. Therefore, the angle of illumination and the orientation of the polariser may be optimised to maximise the exclusion of the specular reflections from the detector. A further polariser 18a may be also be provided to first linearly polarise the illumination light on the way to the target. Alternatively, when circularly polarised light is reflected by the material surface in a specular manner, the polarity of the light may be reversed. Therefore, a polariser 18a adjacent the first LED 1 may be provided to circularly polarise the illumination beam. In this case, the second polariser 18b may be configured to exclude reflection light with the opposite handedness to the illumination beam. The reversal of the handedness of the light is again dependent upon the angle of incidence. Therefore, the angle of incidence may be optimised to maximise the reversal of polarity, and thus to maximise the exclusion of specular reflections. A diffuser may also be provided on or near the cover glass, to aid in the colour determination of non-uniform materials, or to allow for spectral ambient light sensing (sALS). If the apparatus is used with the context of a mobile phone or similar device, the diffuser may be internal or external to the device.

Figure 14:
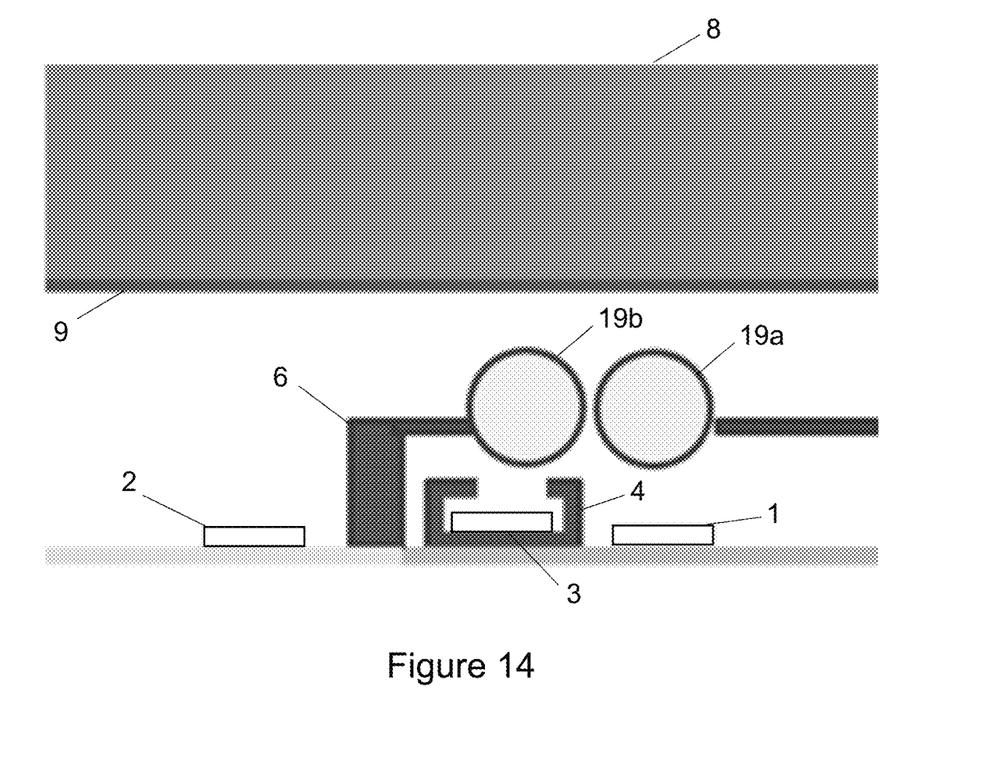
FIG. 14 shows schematically a side view of an exemplary apparatus provided with light steering optics.
Figure 15:
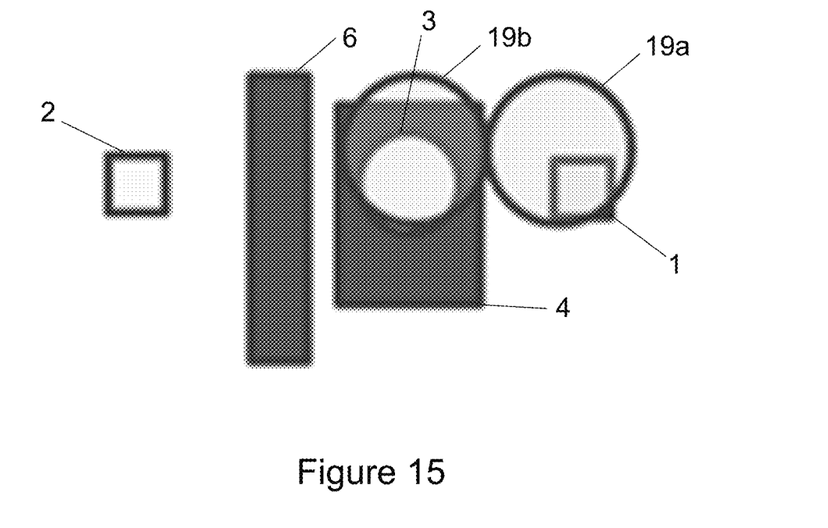
FIG. 15 shows schematically a plan view of the apparatus of FIG. 14.
Figure 16:
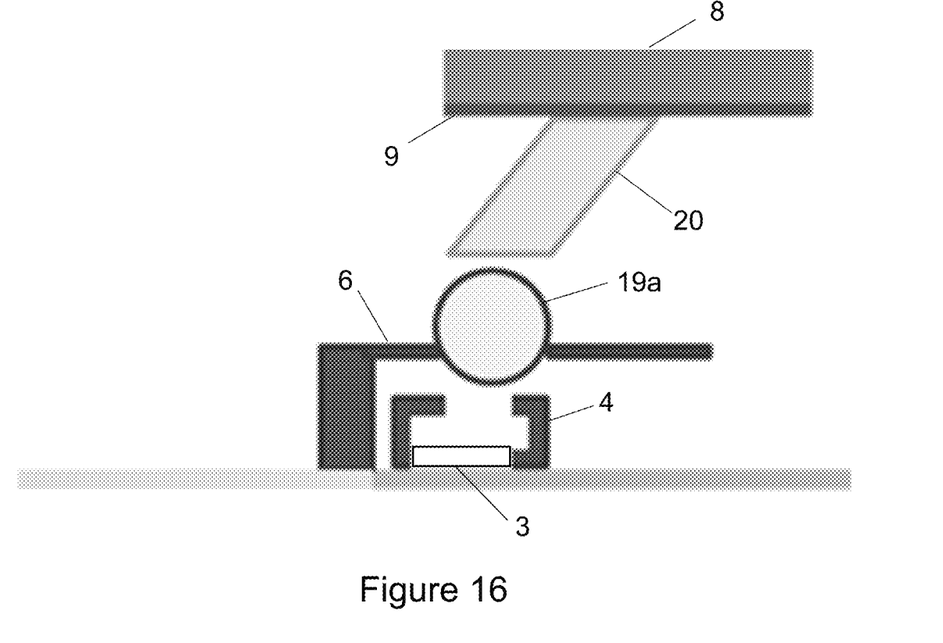
FIG. 16 shows schematically a side view of the apparatus of FIG. 14 with the illumination beam illustrated.

FIG. 14 shows a side view of an apparatus in which beam optics 19 are used to exclude specular reflections. FIG. 15 shows a plan view of the same apparatus. Refractive and/or reflective optics 19a are provided to act upon light emitted from the first LED 1. As shown in the alternative side view of FIG. 16, the optic device 19a deflects the illumination beam 20 by an angle in a plane orthogonal to the plane in which the LED 1 and the detector lie. Therefore, specular reflections will propagate away from the detector. A portion of the diffusely reflected light will propagate in the direction of the detector however. A second optical device 19b may be provided adjacent to the detector, to deflect a portion of this diffusely reflected light into the detector.

Aperture size and shape or additional optics may be used to control the size and shape of the areas of the material which are illuminated (the illumination spot) and measured (the measurement spot). The shape of the illumination spots are not limited, and may, for example be circular or elliptical, for example with dimensions of 3.0 mm×2.8 mm. In other configurations, a second aperture 16 (as provided in the apparatus of FIG. 7) may be crescent shaped. The measurement spot may be circular, and may have a diameter of, for example, 2.0 mm full width at half maximum (FWHM).

In order to aid colour determination, the light sources may emit light over a broad range of wavelengths, for example, over all visible wavelengths. This may be achieved by using broadband light sources such as white LEDs, for example OSRAM OS-CORE LEDs. Alternatively, this may be achieved by using multiple narrow-band light sources. It is advantageous for both the first and second LEDs 1, 2 to emit the same spectrum. Depending upon the application, the LEDs may also need to be small, for example Luxeon FlipChip White 05 LEDs with a centre to centre distance of 3.0 mm, or Cree LEDs with 1 or 0.75 mm edge length. Alternative applications may also call for fluorescent or narrow-band light sources.

The detector is not limited, but may have a spectral range extending from ultraviolet (UV) to near infrared (NIR). The detector may comprise, for example, the commercially available A77341 sensor (AMS), which has a built-in diffuser. The apparatus may use broad band LEDs and narrow band filters. One could use a combination of narrow band LEDs and a wide band filter on the detector. A combination of narrow-band LEDs and narrow-band filters might also be used.

The invention claimed is:

1. Apparatus for determining a colour of a translucent material, the apparatus comprising:
    a first light source configured to illuminate a translucent material at a first surface location;
    a second light source configured to illuminate the translucent material at a second surface location spaced apart from said first surface location; and
    a light spectral sensor configured to detect both first light originating from said first light source and second light originating from said second light source, wherein the first light and second light are both detected at said first surface location,
    the apparatus being configured to operate the first and second light sources alternately, wherein the first light detected at said first surface location by the light spectral sensor and originating from said first light source is principally light diffusely reflected from said first surface location, whilst the second light detected by said light spectral sensor at said first surface location and originating from said second light source is principally light scattered by scattering centres in an interior of the translucent material,
    the apparatus further comprising:
    a processor for combining light spectra detected by the light spectral sensor at said first surface location whilst operating each of the first and second light sources, to provide a combined light spectrum indicative of the colour of the translucent material.

2. The apparatus according to claim 1, wherein said first and second light sources are white light sources.

3. The apparatus according to claim 1, wherein said first and second light sources are respective first and second spaced apart light emitting diodes.

4. The apparatus according to claim 1 and comprising a light blocking barrier located between, on a first side of the light blocking barrier, said first light source and said light spectral sensor, and on a second side of the light blocking barrier, the second light source, the light blocking barrier substantially preventing the second light from reaching the light spectral sensor other than by transmission through the translucent material.

5. The apparatus according to claim 1 and comprising a light blocking barrier located between, on a first side of the light blocking barrier, at least said first light source and said light spectral sensor, and on a second side of the light blocking barrier the translucent material, the light blocking barrier having an aperture provided therein to transmit light through the barrier.

6. The apparatus according to claim 5, said aperture being located substantially above one of the first light source and the light spectral sensor.

7. The apparatus according to claim 1 and comprising a housing within which the light spectral sensor is located, the housing having an aperture such that the first light and the second light at said first location are able to enter the housing whilst light transmitted directly from the first/or second light source is substantially blocked.

8. The apparatus according to claim 1 and comprising beam directing optics for directing light between, on a first side of a light blocking barrier, the first light source and the light spectral sensor, and on a second side of the light blocking barrier, the translucent material.

9. The apparatus according to claim 1 and comprising polarizers adjacent to the first light source and the light spectral sensor for polarizing light transmitted between, on a first side of a light blocking barrier, the first light source and the light spectral sensor, and on a second side of the light blocking barrier, the translucent material.

10. The apparatus according to claim 1, said processor being further configured to map the combined light spectrum to an opaque colour reference.

11. The apparatus according to claim 1, wherein said first and second light sources and said light spectral sensor are located substantially in a common plane.

12. The apparatus according to claim 11 and comprising a layer of transparent material substantially coplanar with said common plane wherein, in use, said translucent material is held against said layer.

13. A method of determining a colour of a translucent material, the method comprising:
operating a first light source to illuminate the translucent material at a first surface location;
operating a second light source to illuminate the translucent material at a second surface location spaced apart from said first surface location;
wherein the first and second light sources are operated alternately;
detecting light at said first surface location such that light detected is principally a combination of both (a) first light originating from said first light source and diffusely reflected from said first surface location and (b) second light originating from said second light source and scattered by scattering centres in an interior of the translucent material,
the method further comprising:
combining light spectra detected by a light spectral sensor at said first surface location whilst operating each of the first and second light sources, to provide a combined light spectrum indicative of the colour of the translucent material.

14. A method according to claim 13, wherein said first and second light sources are white light sources.

15. A method according to claim 13, wherein said first and second light sources are respective first and second spaced apart light emitting diodes.

16. A method according to claim 13, further comprising: substantially preventing second light from reaching the light spectral sensor other than by transmission through the translucent material.

17. A method according to claim 13, further comprising: directing light between, on a first side of a light blocking barrier, the first light source and the light spectral sensor, and on a second side of the light blocking barrier, the translucent material, by beam directing optics.

18. A method according to claim 13, further comprising: polarizing light transmitted between, on a first side of a light blocking barrier, the first light source and the light spectral sensor, and on a second side of the light blocking barrier, the translucent material.

19. A method according to claim 13, further comprising; mapping the combined light spectrum to an opaque colour reference.

* * * * *